(12) United States Patent
Deshpande

(10) Patent No.: US 11,070,845 B2
(45) Date of Patent: Jul. 20, 2021

(54) SYSTEMS AND METHODS FOR SIGNALING OF MOTION-CONSTRAINED TILE SETS FOR VIRTUAL REALITY APPLICATIONS

(71) Applicant: Sharp Kabushiki Kaisha, Sakai (JP)

(72) Inventor: Sachin G. Deshpande, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/475,157

(22) PCT Filed: Dec. 13, 2017

(86) PCT No.: PCT/JP2017/044730
§ 371 (c)(1),
(2) Date: Jul. 1, 2019

(87) PCT Pub. No.: WO2018/128060
PCT Pub. Date: Jul. 12, 2018

(65) Prior Publication Data
US 2019/0342581 A1 Nov. 7, 2019

Related U.S. Application Data

(60) Provisional application No. 62/442,918, filed on Jan. 5, 2017.

(51) Int. Cl.
*H04N 19/70* (2014.01)
*H04N 19/109* (2014.01)
*H04N 19/174* (2014.01)

(52) U.S. Cl.
CPC .......... *H04N 19/70* (2014.11); *H04N 19/109* (2014.11); *H04N 19/174* (2014.11)

(58) Field of Classification Search
CPC .. H04N 19/119; H04N 19/132; H04N 19/146; H04N 19/167; H04N 19/174; H04N 19/33; H04N 19/34; H04N 19/46; H04N 19/70; H04N 19/88; H04N 19/109
See application file for complete search history.

(56) References Cited

U.S. PATENT DOCUMENTS

| | | | |
|---|---|---|---|
| 9,723,317 B2* | 8/2017 | Hattori | H04N 19/70 |
| 2015/0016539 A1* | 1/2015 | Hattori | H04N 19/137 |
| | | | 375/240.24 |
| 2019/0014337 A1* | 1/2019 | Skupin | H04N 19/167 |
| 2019/0020884 A1* | 1/2019 | Skupin | H04N 19/70 |

OTHER PUBLICATIONS

Skupin, "Motion-Constrained Tile Sets Extraction Information SEI Messages Draft 1", Joint Collaborative Team on Video Coding (JCT-VC) of ITU-T SG 16 WP3 and ISO/IEC JTC 1/SC 29/WG 11, JCTV-Y1008, Oct. 14-21, 2016 (Year: 2016).*

(Continued)

*Primary Examiner* — Jessica M Prince
(74) *Attorney, Agent, or Firm* — Keating & Bennett, LLP

(57) ABSTRACT

A method of signaling a motion-constrained tile set is described. According to an aspect of an invention, a value specifying a temporal identifier associated with a replacement picture parameter set is included in SEI message.

3 Claims, 7 Drawing Sheets

(56) References Cited

OTHER PUBLICATIONS

International Telecommunication Union, "Series H: Audiovisual and Multimedia Systems, Infrastructure of audiovisual services—Coding of moving video, High efficiency video coding", Recommendation ITU-T H.265, Apr. 2015, 632 pages.

Skupin, "Motion-Constrained Tile Sets Extraction Information SEI Messages Draft 1", Joint Collaborative Team on Video Coding (JCT-VC) of ITU-T SG 16 WP 3 and ISO/IEC JTC 1/SC 291WG 11, JCTVC-Y1008, Oct. 14-21, 2016 pp. 1-6.

Boyce et al., "HEVC Additional Supplemental Enhancement Information (Draft1)", Joint Collaborative Team on Video eroding (JCT-VC) of ITU-T SG 16 WP 3 and ISO/IEC JTC 1/SC 291WG 11, JCTVC-Z1005, Jan. 12-20, 2017, pp. 1-19.

Deshpande, "On Motion-Constrained Tile Sets Extraction Information Set SEI", Joint Collaborative Team on Video eroding (JCT-VC) of ITU-T SG 16 WP 3 and ISO/IEC JTC 1/SC 291WG 11, Jan. 12-20, 2017, JCTVC-Z0037, pp. 1-5.

Skupin et al., "On MCTS extraction", Joint Collaborative Team on Video Coding (JCT-VC) of ITU-T SG 16 WP 3 and ISO/IEC JTC 1/SC 29/WG 11, JCTVC-Y0031, Oct. 14-21, 2016, pp. 1-5.

* cited by examiner

SYSTEMS AND METHODS FOR SIGNALING OF MOTION-CONSTRAINED TILE SETS FOR VIRTUAL REALITY APPLICATIONS

CROSS REFERENCE

This Nonprovisional application claims priority under 35 U.S.C. § 119 on provisional Application No. 62/442,918 on Jan. 5, 2017, the entire contents of which are hereby incorporated by reference.

TECHNICAL FIELD

This disclosure relates to video coding and more particularly to techniques for signaling of motion-constrained tile sets.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265 April 2015, which is incorporated by reference, and referred to herein as ITU-T H.265. Video compression techniques enable data requirements for storing and transmitting video data to be reduced.

Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream. Compliant bitstreams and associated metadata may be formatted according to data structures. Sub-bitstream extraction may refer to a process where a device receiving a compliant bitstream modifies data in the received bitstream. Current techniques for sub-bitstream extraction video data may be less than ideal.

SUMMARY OF INVENTION

An aspect of the invention is a method of signaling of a motion-constrained tile set, the method comprising: generating a message including a replacement picture parameter set and a value specifying a temporal identifier associated with the replacement picture parameter set; and transmitting the generated message over a communications medium.

An aspect of the invention is a method of performing sub-bitstream extraction of a motion-constrained tile set, the method comprising: receiving a message including a replacement picture parameter set and a value specifying a temporal identifier associated with the replacement picture parameter set; and performing sub-bitstream extraction based on the temporal identifier associated with the replacement picture parameter set.

DESCRIPTION OF EMBODIMENTS

Figure 1:
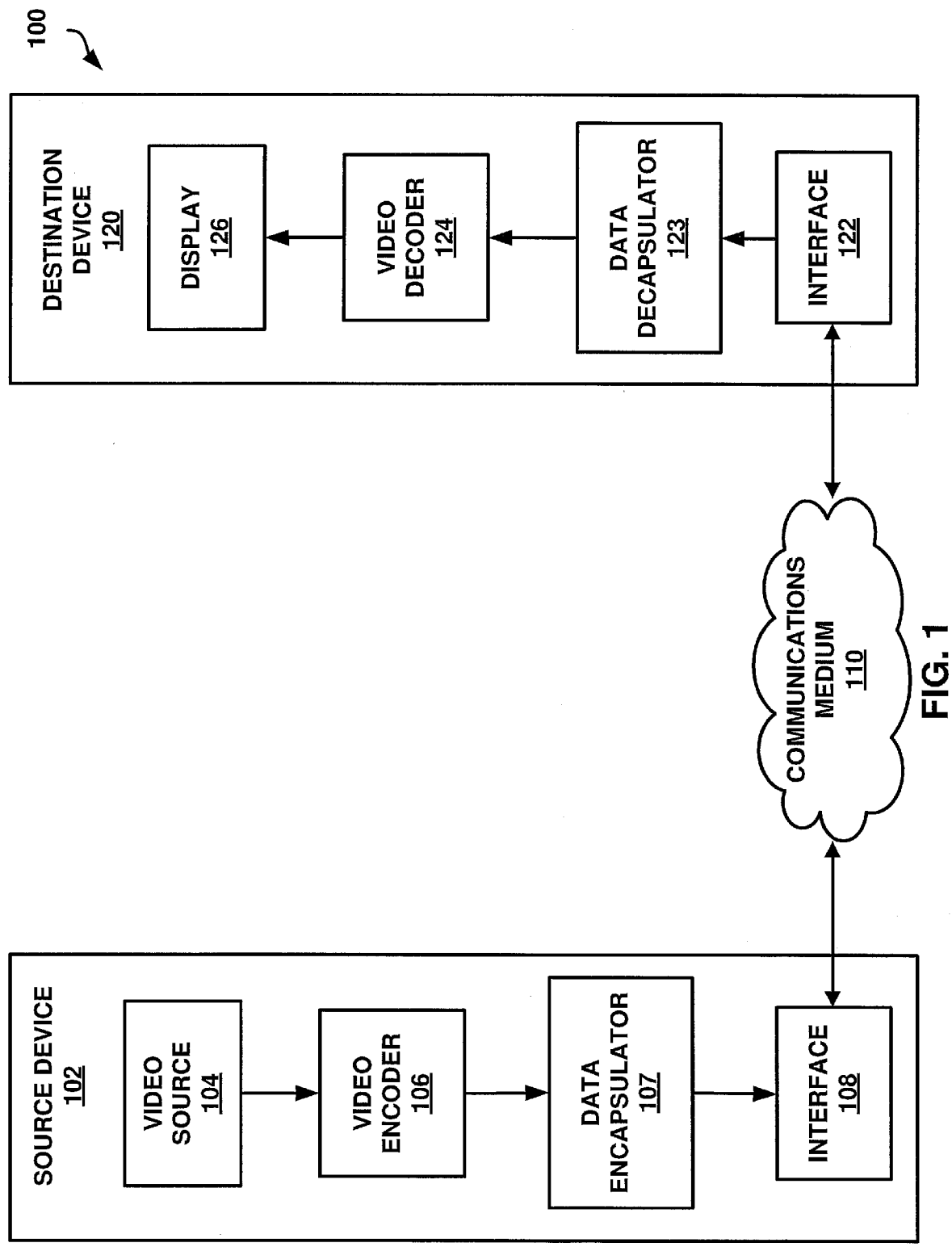
FIG. 1 is a block diagram illustrating an example of a system that may be configured to encode and decode video data according to one or more techniques of this disclosure.

In general, this disclosure describes various techniques for coding video data. In particular, this disclosure describes techniques for signaling of motion-constrained tile sets (MCTS). Signaling of motion-constrained tiles sets according to the techniques described herein may be particularly useful for enabling extraction of a MCTS from a conformant bitstream. It should be noted that although techniques of this disclosure are described with respect to ITU-T H.264 and ITU-T H.265, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265. Thus, reference to ITU-T H.264 and ITU-T H.265 is for descriptive purposes and should not be construed to limit the scope of the techniques described herein. Further, it should be noted that incorporation by reference of documents herein should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

Video content typically includes video sequences comprised of a series of frames. A series of frames may also be referred to as a group of pictures (GOP). Each video frame or picture may include a one or more slices, where a slice includes a plurality of video blocks. A video block may be defined as the largest array of pixel values (also referred to as samples) that may be predictively coded. Video blocks may be ordered according to a scan pattern (e.g., a raster scan). A video encoder performs predictive encoding on video blocks and sub-divisions thereof. ITU-T H.264 specifies a macroblock including 16×16 luma samples. ITU-T H.265 specifies an analogous Coding Tree Unit (CTU) structure where a picture may be split into CTUs of equal size and each CTU may include Coding Tree Blocks (CTB) having 16×16, 32×32, or 64×64 luma samples. As used herein, the term video block may generally refer to an area of a picture or may more specifically refer to the largest array of pixel values that may be predictively coded, sub-divisions thereof, and/or corresponding structures. Further, according to ITU-T H.265, each video frame or picture may be partitioned to include one or more tiles, where a tile is a sequence of coding tree units corresponding to a rectangular area of a picture.

In ITU-T H.265, the CTBs of a CTU may be partitioned into Coding Blocks (CB) according to a corresponding quadtree block structure. According to ITU-T H.265, one luma CB together with two corresponding chroma CBs and associated syntax elements are referred to as a coding unit (CU). A CU is associated with a prediction unit (PU) structure defining one or more prediction units (PU) for the CU, where a PU is associated with corresponding reference samples. That is, in ITU-T H.265 the decision to code a picture area using intra prediction or inter prediction is made at the CU level and for a CU one or more predictions corresponding to intra prediction or inter prediction may be used to generate reference samples for CBs of the CU. In ITU-T H.265, a PU may include luma and chroma prediction blocks (PBs), where square PBs are supported for intra prediction and rectangular PBs are supported for inter prediction. Intra prediction data (e.g., intra prediction mode syntax elements) or inter prediction data (e.g., motion data syntax elements) may associate PUs with corresponding reference samples. Residual data may include respective arrays of difference values corresponding to each component of video data (e.g., luma (Y) and chroma (Cb and Cr)). Residual data may be in the pixel domain. A transform, such as, a discrete cosine transform (DCT), a discrete sine transform (DST), an integer transform, a wavelet transform, or a conceptually similar transform, may be applied to pixel difference values to generate transform coefficients. It should be noted that in ITU-T H.265, CUs may be further sub-divided into Transform Units (TUs). That is, an array of pixel difference values may be sub-divided for purposes of generating transform coefficients (e.g., four 8×8 transforms may be applied to a 16×16 array of residual values corresponding to a 16×16 luma CB), such sub-divisions may be referred to as Transform Blocks (TBs). Transform coefficients may be quantized according to a quantization parameter (QP). Quantized transform coefficients (which may be referred to as level values) may be entropy coded according to an entropy encoding technique (e.g., content adaptive variable length coding (CAVLC), context adaptive binary arithmetic coding (CABAC), probability interval partitioning entropy coding (PIPE), etc.). Further, syntax elements, such as, a syntax element indicating a prediction mode, may also be entropy coded. Entropy encoded quantized transform coefficients and corresponding entropy encoded syntax elements may form a compliant bitstream that can be used to reproduce video data. A binarization process may be performed on syntax elements as part of an entropy coding process. Binarization refers to the process of converting a syntax value into a series of one or more bits. These bits may be referred to as "bins."

Figure 2A:
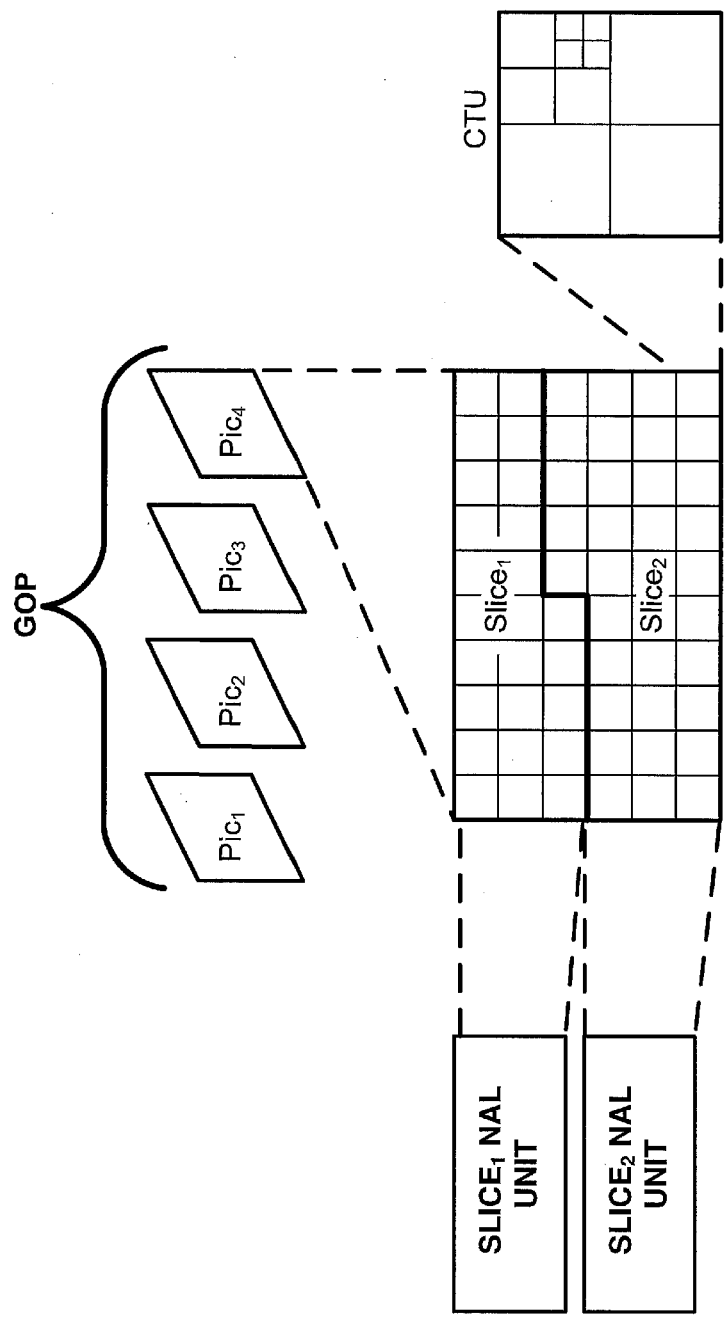
FIG. 2A is a conceptual diagram illustrating coded video data and corresponding data structures according to one or more techniques of this disclosure.
Figure 2B:
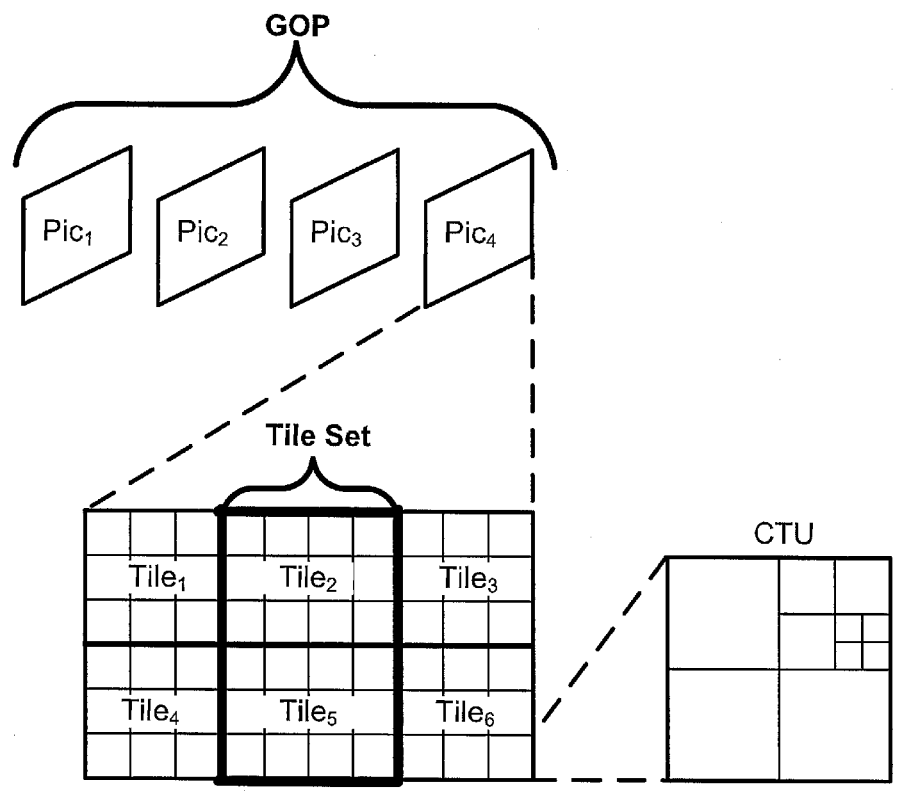
FIG. 2B is a conceptual diagram illustrating coded video data and corresponding data structures according to one or more techniques of this disclosure.

As described above, according to ITU-T H.265, each video frame or picture may be partitioned to include one or more slices and further partitioned to include one or more tiles. FIGS. 2A-2B are conceptual diagrams illustrating an example of a group of pictures including slices and further partitioning pictures into tiles. In the example illustrated in FIG. 2A, $Pic_4$ is illustrated as including two slices (i.e., $Slice_1$ and $Slice_2$) where each slice includes a sequence of CTUs (e.g., in raster scan order). In the example illustrated in FIG. 2B, $Pic_4$ is illustrated as including six tiles (i.e., $Tile_1$ to $Tile_6$), where each tile is rectangular and includes a sequence of CTUs. It should be noted that in ITU-T H.265, a tile may consist of coding tree units contained in more than one slice and a slice may consist of coding tree units contained in more than one tile. However, ITU-T H.265 provides that one or both of the following conditions shall be fulfilled: (1) All coding tree units in a slice belong to the same tile; and (2) All coding tree units in a tile belong to the same slice. Thus, with respect to FIG. 2B, each of the tiles may belong to a respective slice (e.g., $Tile_1$ to $Tile_6$ may respectively belong to slices, $Slice_1$ to $Slice_6$) or multiple tiles may belong to a slice (e.g., $Tile_1$ to $Tile_3$ may belong to $Slice_1$, and $Tile_4$ to $Tile_6$ may belong to $Slice_2$).

Further, as illustrated in FIG. 2B, tiles may form tile sets (i.e., $Tile_2$ and $Tile_5$ form a tile set). Tile sets may be used to define boundaries for coding dependencies (e.g., intra-prediction dependencies, entropy encoding dependencies, etc.) and as such, may enable parallelism in coding and region-of-interest coding. For example, if the video sequence in the example illustrated in FIG. 2B corresponds to a nightly news program, the tile set formed by $Tile_2$ and $Tile_5$ may correspond to a visual region-of-interest including a news anchor reading the news. ITU-T H.265 defines signaling that enables motion-constrained tile sets (MCTS). A motion-constrained tile set may include a tile set for which inter-picture prediction dependencies are limited to the collocated tile sets in reference pictures. Thus, it is possible to perform motion compensation for a given MCTS independent of the decoding of other tile sets outside the MCTS. For example, referring to FIG. 2B, if the tile set formed by $Tile_2$ and $Tile_5$ is a MCTS and each of $Pic_1$ to $Pic_3$ include collocated tile sets, motion compensation may be performed on $Tile_2$ and $Tile_5$ independent of coding $Tile_1$, $Tile_3$, $Tile_4$, and $Tile_6$ in $Pic_4$ and tiles collocated with tiles $Tile_1$, $Tile_3$, $Tile_4$, and $Tile_6$ in each of $Pic_t$ to $Pic_a$. Coding video data according to MCTS may be useful for video applications including multi-directional and omni-directional video presentations (e.g., 180 to 360 degree video presentations used in virtual reality applications).

In ITU-T H.265, a coded video sequence (CVS) may be encapsulated (or structured) as a sequence of access units, where each access unit includes video data structured as network abstraction layer (NAL) units. In ITU-T H.265, a bitstream is described as including a sequence of NAL units forming one or more CVSs. In ITU-T H.265, access units and NAL units are defined as:

access unit: A set of NAL units that are associated with each other according to a specified classification rule, are consecutive in decoding order, and contain exactly one coded picture with nuh_layer_id equal to 0 . . . . In addition to containing the video coding layer (VCL) NAL units of the coded picture with nuh_layer_id equal to 0, an access unit may also contain non-VCL NAL units.

network abstraction layer (NAL) unit: A syntax structure containing an indication of the type of data to follow and bytes containing that data in the form of an raw byte sequence payload (RBSP) interspersed as necessary with emulation prevention bytes.

It should be noted that with respect to a nuh_layer_id, ITU-T H.265 supports multi-layer extensions, including format range extensions (RExt), scalability (SHVC), multi-view (MV-HEVC), and 3-D (3D-HEVC). Multi-layer extensions enable a video presentation to include a base layer and one or more additional enhancement layers. For example, a base layer may enable a video presentation having a basic level of quality (e.g., High Definition rendering) to be presented and an enhancement layer may enable a video presentation having an enhanced level of quality (e.g., an Ultra High Definition rendering) to be presented. In ITU-T H.265, an enhancement layer may be coded by referencing a base layer. That is, for example, a picture in an enhancement layer may be coded (e.g., using inter prediction techniques) by referencing one or more pictures (including scaled versions thereof) in a base layer. In ITU-T H.265, each NAL unit may include an identifier (i.e., nuh_layer_id) indicating a layer of video data the NAL unit is associated with, where a coded picture with nuh_layer_id equal to 0 is included in a base layer. ITU-T H.265 defines a nuh_layer_id syntax element as follows: nuh_layer_id specifies the identifier of the layer to which a VCL (Video Coding Layer) NAL unit belongs or the identifier of a layer to which a non-VCL NAL unit applies.

Further, ITU-T H.265 supports temporal sub-layers for a layer of video data. For example, in ITU-T H.265, a layer of video data may include a 30 Hz sub-layer and a 60 Hz sub-layer. ITU-T H.265 provides where a sub-layer is defined as follows and temporal identifiers (also referred to as TemporalId) are identified using the nuh_temporal_id_plus1 syntax element.

sub-layer: A temporal scalable layer of a temporal scalable bitstream, consisting of VCL NAL units with a particular value of the TemporalId variable and the associated non-VCL NAL units.

nuh_temporal_id_plus1 minus 1 specifies a temporal identifier for the NAL unit. The value of nuh_temporal_id_plus1 shall not be equal to 0.

Referring to the example illustrated in FIG. 2A, each slice of video data included in Pic$_4$ (i.e., Slice$_1$ and Slice$_2$) is illustrated as being encapsulated in a NAL unit. Further, in ITU-T H.265 each of a video sequence, a GOP, a picture, a slice, and CTU may be associated with metadata that describes video coding properties. ITU-T H.265 defines parameters sets that may be used to describe video data and/or video coding properties. In ITU-T H.265, parameter sets may be encapsulated as a special type of NAL unit or may be signaled as a message. NAL units including coded video data (e.g., a slice) may be referred to as VCL (Video Coding Layer) NAL units and NAL units including metadata (e.g., parameter sets) may be referred to as non-VCL NAL units. ITU-T H.265 provides the following types of defined parameter sets:

video parameter set (VPS): A syntax structure containing syntax elements that apply to zero or more entire coded video sequences (CVSs) as determined by the content of a syntax element found in the SPS referred to by a syntax element found in the PPS referred to by a syntax element found in each slice segment header.

sequence parameter set (SPS): A syntax structure containing syntax elements that apply to zero or more entire CVSs as determined by the content of a syntax element found in the PPS referred to by a syntax element found in each slice segment header.

picture parameter set (PPS): A syntax structure containing syntax elements that apply to zero or more entire coded pictures as determined by a syntax element found in each slice segment header.

Figure 3:
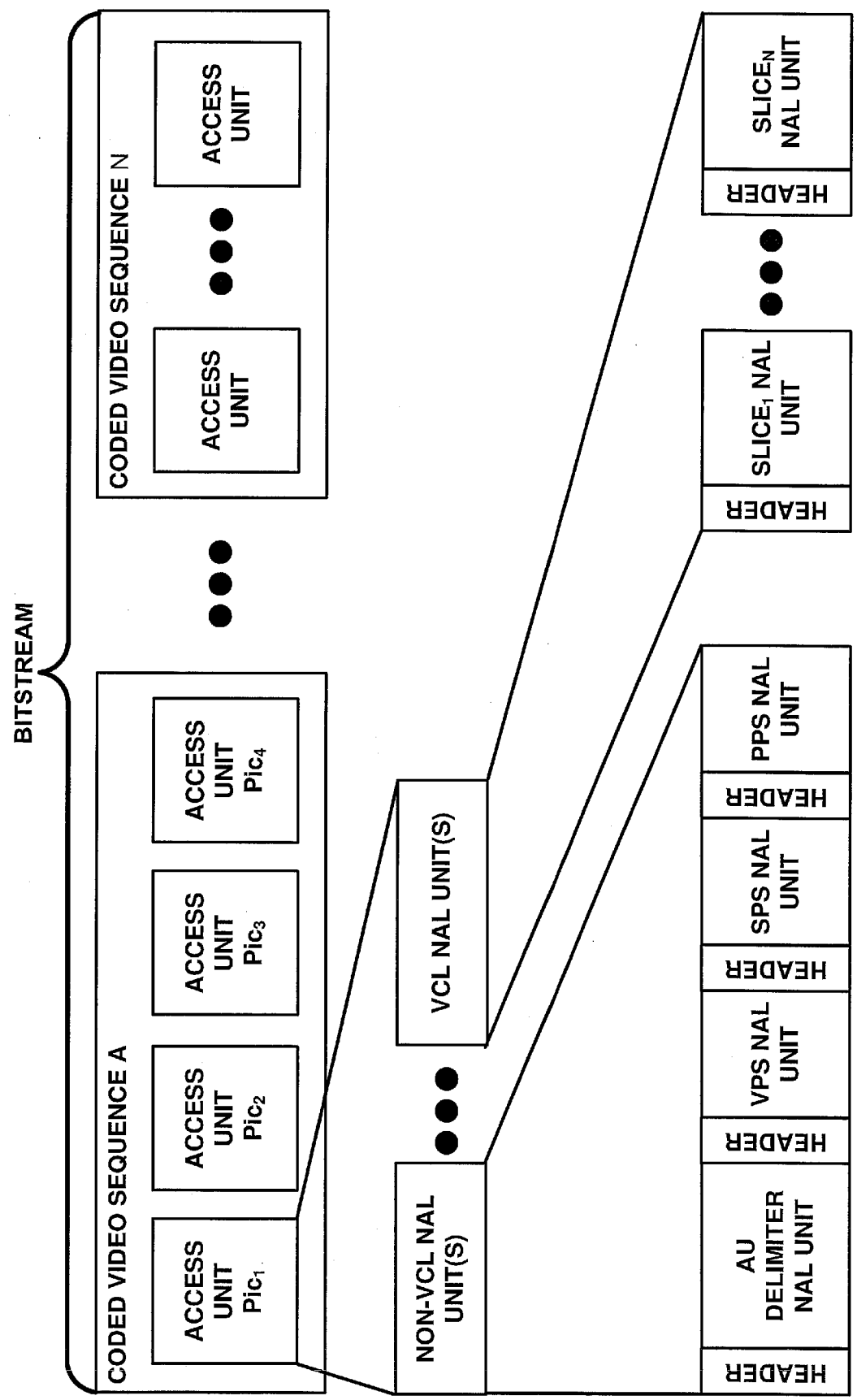
FIG. 3 is a conceptual diagram illustrating a data structure encapsulating coded video data and corresponding metadata according to one or more techniques of this disclosure.

Referring to FIG. 3, FIG. 3 illustrates an example of a bitstream including multiple CVSs, where a CVS is represented by NAL units included in a respective access unit. In the example, illustrated in FIG. 3, non-VCL NAL units include respective parameter set units (i.e., VPS, SPS, and PPS units) and an access unit delimiter NAL unit. It should be noted that ITU-T H.265 defines NAL unit header semantics that specify the type of Raw Byte Sequence Payload (RBSP) data structure included in the NAL unit. Table 1 illustrates the syntax of a NAL unit header as provided in ITU-T H.265. It should be noted that in Table 1 and other tables included herein descriptors specify the parsing process of a syntax elements according to ITU-T H.265. For the sake of brevity, a complete discussion of the descriptors defined in ITU-T H.265 is not re-produced herein, however, reference is made to Section 7.2 of ITU-T H.265.

TABLE 1

| | Descriptor |
|---|---|
| nal_unit_header( ) { | |
|   forbidden_zero_bit | f(1) |
|   nal_unit_type | u(6) |
|   nuh_layer_id | u(6) |
|   nuh_temporal_id_plus1 | u(3) |
| } | |

The definitions for syntax elements nuh_layer_id and nuh_temporal_id_plus1 in ITU-T H.265 are provided above. ITU-T H.265 provides where forbidden zero bit shall be equal to zero and where nal_unit_type specifies the type of data structure included in the NAL unit. Referring to Table 1, it should be noted that ITU-T H.265 allows for an access unit to include multiple NAL units including respective PPS payloads, where each NAL includes a unique nuh_temporal_id_plus1. For example, a picture (e.g., which enables a 30 Hz presentation) included in an access unit may be coded using parameters from a first PPS with a first nuh_temporal_id_plus1 and another picture (e.g., which enables a 60 Hz presentation) may be coded using parameters from a second PPS with a second nuh_temporal_id_plus1.

Further, ITU-T H.265 enables supplemental enhancement information (SEI) messages to be signaled. In ITU-T H.265, SEI messages assist in processes related to decoding, display or other purposes, however, SEI messages may not be required for constructing the luma or chroma samples by the decoding process. In ITU-T H.265, SEI messages may be signaled in a bitstream using non-VCL NAL units. Further, SEI messages may be conveyed by some means other than by being present in the bitstream (i.e., signaled out-of-band). SEI messages may enable sub-bitstream extraction. Sub-bitstream extraction may refer to a process where a device receiving a ITU-T H.265 compliant bitstream forms a new ITU-T H.265 compliant bitstream by discarding and/or modifying data in the received bitstream. For example, a device may receive a bitstream including multiple layers of video data. An application running on the device may wish to only decode a base layer of video data and as such, the device may discard VCL NAL units corresponding to layers other than the base layer.

As described above, a coded video sequence may include a motion-constrained tile set. Skupin, "Motion-Constrained Tile Sets Extraction Information SEI Messages Draft 1," JCTVC-Y1008, October 2016, Chengdu, Conn., which is incorporated by reference, and referred to herein as Skupin, describes potential modifications to the ITU-T H.265 specification to enable extraction of a motion-constrained tile set (MCTS) as an individual ITU-T H.265 conformant bitstream. In particular, Skupin specifies a (1) An MCTS extraction information set SEI message that provides syntax for carriage of MCTS specific replacement parameter sets and defines the extraction process in the semantics (referred to as mcts_extraction_info_set); and (2) An MCTS extraction information nesting SEI message, provides syntax for MCTS specific nested SEI messages (mcts_extraction_info_nesting). Table 2 illustrates the syntax provided for mcts_extraction_info_set SEI in Skupin.

TABLE 2

|  | Descriptor |
|---|---|
| mcts_extraction_info_set( ) { |  |
|   num_extraction_info_sets_minus1 | ue(v) |
|   for( i = 0; i <= num_extraction_information_sets_minus1; i++ ) { |  |
|     num_associated_tile_set_identifiers_minus1[ i ] | ue(v) |
|     for( j = 0; j <= num_associated_tile_set_identifiers_minus1[ i ]; j++ ) |  |
|       mcts_identifier[ i ][ j ] | ue(v) |
|     num_vps_in_extraction_info_set_minus1[ i ] | ue(v) |
|     for( j = 0; j <= num_vps_in_extraction_set_minus1[ i ]; j++ ) |  |
|       vps_rbsp_data_length[ i ][ j ] | ue(v) |
|     num_sps_in_extraction_info_set_minus1[ i ] | ue(v) |
|     for( j = 0; j <= num_sps_in_extraction_set_minus1[ i ]; j++ ) |  |
|       sps_rbsp_data_length[ i ][ j ] | ue(v) |
|     num_pps_in_extraction_info_set_minus1[ i ] | ue(v) |
|     for( j = 0; j <= num_pps_in_extraction_set_minus1[ i ]; j++ ) |  |
|       pps_rbsp_data_length[ i ][ j ] | ue(v) |
|     while( !byte_aligned( ) ) |  |
|       mcts_alignment_bit_equal_to_zero | f(1) |
|     for( j = 0; j <= num_vps_in_extraction_set_minus1[ i ]; j++ ) |  |
|       for( k = 0; k <= vps_rbsp_data_length[ i ][ j ]; k++ ) |  |
|         vps_rbsp_data_bytes[ i ][ j ][ k ] | u(8) |
|     for( j = 0; j <= num_sps_in_extraction_set_minus1[ i ]; j++ ) |  |
|       for( k = 0; k <= sps_rbsp_data_length[ i ][ j ]; k++ ) |  |
|         sps_rbsp_data_bytes[ i ][ j ][ k ] | u(8) |
|     for( j = 0; j <= num_pps_in_extraction_set_minus1[ i ]; j++ ) |  |
|       for( k = 0; k <= pps_rbsp_data_length[ i ][ j ]; k++ ) |  |
|         pps_rbsp_data_bytes[ i ][ j ][ k ] | u(8) |
|   } |  |
| } |  |

Skupin provides the following definitions for the syntax elements in Table 2:

num_extraction_info_sets_minus1 plus 1 indicates the number of extraction information sets contained in the MCTS extraction information set SEI message to be applied in the mcts extraction process. The value of num_extraction_info_sets_minus1 shall be in the range of 0 to $2^{32}-2$, inclusive.

num_associated_tile_set_identifiers_minus1[i] plus 1 indicates the number of values of mcts_id of the tile sets in the i-th extraction information set. The value of num_extraction_info_sets_minus1[i] shall be in the range of 0 to $2^{32}-2$, inclusive.

mcts_identifier[i][j] identifies the j-th tile set with mcts_id equal to mcts_identifier[i][k] associated to the i-th extraction information set. The value of mcts_identifier[i][j] shall be in the range of 0 to $2^{32}-2$, inclusive.

num_vps_in_extraction_info_set_minus1[i] plus 1 indicates the number of replacement video parameter sets in the i-th extraction information set. The value of num_vps_in_extraction_info_set_minus1[i] shall be in the range of 0 to 15, inclusive.

vps_rbsp_data_length[i][j] indicates the number of bytes vps_rbsp_data_bytes[i][j][k] of the following j-th replacement video parameter set in the i-th extraction information set.

num_sps_in_extraction_info_set_minus1[i] plus 1 indicates the number of replacement sequence parameter sets in the i-th extraction information set. The value of num_sps_in_extraction_info_set_minus1[i] shall be in the range of 0 to 15, inclusive.

sps_rbsp_data_length[i][j] indicates the number of bytes sps_rbsp_data_bytes[i][j][k] of the following j-th replacement sequence parameter set in the i-th extraction information set.

num_pps_in_extraction_info_set_minus1[i] plus 1 indicates the number of replacement picture parameter sets in the i-th extraction information set. The value of num_pps_in_extraction_info_set_minus1[i] shall be in the range of 0 to 63, inclusive.

pps_rbsp_data_length[i][j] indicates the number of bytes pps_rbsp_data_bytes[i][j][k] of the following j-th replacement picture parameter set in the i-th extraction information set.

mcts_alignment_bit_equal_to_zero shall be equal to 0.

vps_rbsp_data_bytes[i][j][k] contains the k-th byte of the RBSP of the following j-th replacement video parameter set in the i-th extraction information set.

sps_rbsp_data_bytes[i][j][k] contains the k-th byte of the RBSP of the following j-th replacement sequence parameter set in the i-th extraction information set.

pps_rbsp_data_bytes[i][j][k] contains the k-th byte of the RBSP of the following j-th replacement picture parameter set in the i-th extraction information set.

Further, Skupin provides the following description of how a sub-bitstream MCTS extraction process is applied:

Let a bitstream inBitstream, a target MCTS identifier mctsIdTarget and target MCTS extraction information set identifier mctsEISIdTarget be the inputs to the sub-bitstream MCTS extraction process.

The output of the sub-bistream MCTS extraction process is a sub-bitstream outBitstream.

It is a requirement of bitstream conformance for the input bitstream that any output sub-bitstream that is the output of the process specified in this clause with the bitstream shall be a conforming bitstream.

The output sub-bitstream is derived as follows:
The bitstream outBitstream is set to be identical to the bitstream inBitstream.
The lists ausWithVPS, ausWithSPS and ausWithPPS are set to consist of all access units within outBitstream containing VCL NAL units with types VPS_NUT, SPS_NUT and PPS_NUT.
Remove all SEI NAL units that have nuh_layer_id equal to 0 and that contain non-nested SEI messages.
NOTE 2—A "smart" bitstream extractor may include appropriate non-nested SEI messages in the extracted sub-bitstream, provided that the SEI messages applicable to the sub-bitstream were present as nested SEI messages in the mcts_extraction_info_nesting( ) in the original bitstream.
Remove from outBitstream all NAL units with types:
VCL NAL units that contain tiles not belonging to the tile set with mcts_id[i] equal to mctsIdTarget,
non-VCL NAL units with types VPS_NUT, SPS_NUT or PPS_NUT.
Insert into all access units within the list ausWithVPS in outBitstream num_vps_in_extraction_info_minus1 [mctsEISIdTarget] plus 1 NAL units with type VPS_NUT generated from the VPS RBSP data in the mctsEISIdTarget-th MCTS extraction information set, i.e. vps_rbsp_data_bytes[mctsEISIdTarget][j][ ] for all values of j in the range of 0 to num_vps_in_extraction_info_minus1[mctsEISIdTarget], inclusive.
Insert into all access units within the list ausWithSPS in outBitstream num_sps_in_extraction_info_minus1 [mctsEISIdTarget] plus 1 NAL units with type SPS_NUT generated from the SPS RBSP data in the mctsEISIdTarget-th MCTS extraction information set, i.e. sps_rbsp_data_bytes[mctsEISIdTarget][j][ ] for all values of j in the range of 0 to num_sps_in_extraction_info_minus1[mctsEISIdTarget], inclusive.
Insert into all access units within the list ausWithPPS in outBitstream num_vps_in_extraction_info_minus1 [mctsEISIdTarget] plus 1 NAL units with type PPS_NUT generated from the PPS RBSP data in the mctsEISIdTarget-th MCTS extraction information set, i.e. pps_rbsp_data_bytes[mctsEISIdTarget][j][ ] for all values of j in the range of 0 to num_pps_in_extraction_info_minus1[mctsEISIdTarget], inclusive.
For each remaining VCL NAL units in outBitstream, adjust the slice segment header as follows:
For the first VCL NAL unit within each access unit, set the value of first_slice_segment_in_pic_flag equal to 1, otherwise 0.
Set the value of slice segment address according to the tile setup defined in the PPS with pps_pic_parameter_set_id equal to slice_pic_parameter_set_id.

As described above, the MCTS extraction information set SEI message in Skupin provides information which consists of a number of extraction information sets, each containing identifiers of the motion-constrained tile sets to which the extraction information set applies, where each extraction information set contains RBSP bytes of replacement video parameter sets, sequence parameter sets, and picture parameter sets to be used during the sub-bitstream MCTS extraction process. However, it should be noted that in Skupin, during the creation of PPS_NUT from the signalled PPS RBSP data that is signalled in MCTS extraction information set SEI message, additional information is needed to populate the appropriate fields of PPS_NUT NAL Unit Header. Further, in Skupin, the description about how NAL unit header fields should be created for these replacement Parameter Set NUTs is not described. Further, the sub-bitstream MCTS extraction process in Skupin does not allow bitstream extraction based on a target temporal sub-layer.

As described above ITU-T H.265 allows for an access unit to include multiple NAL units including respective PPS payloads, where each NAL includes a unique nuh_temporal_id_plus1. According to the techniques described in Skupin each of the multiple NAL units including respective PPS payloads would be removed indiscriminately and further Skupin fails to describe how values of nuh_temporal_id_plus1 in generated PPS_NUTs should be specified. Thus, in Skupin, generated PPS_NUTs may not have a nuh_temporal_id_plus1 values corresponding to nuh_temporal_id_plus1 values of the removed PPS_NUTs. Thus, the techniques described in Skupin may be less than ideal.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
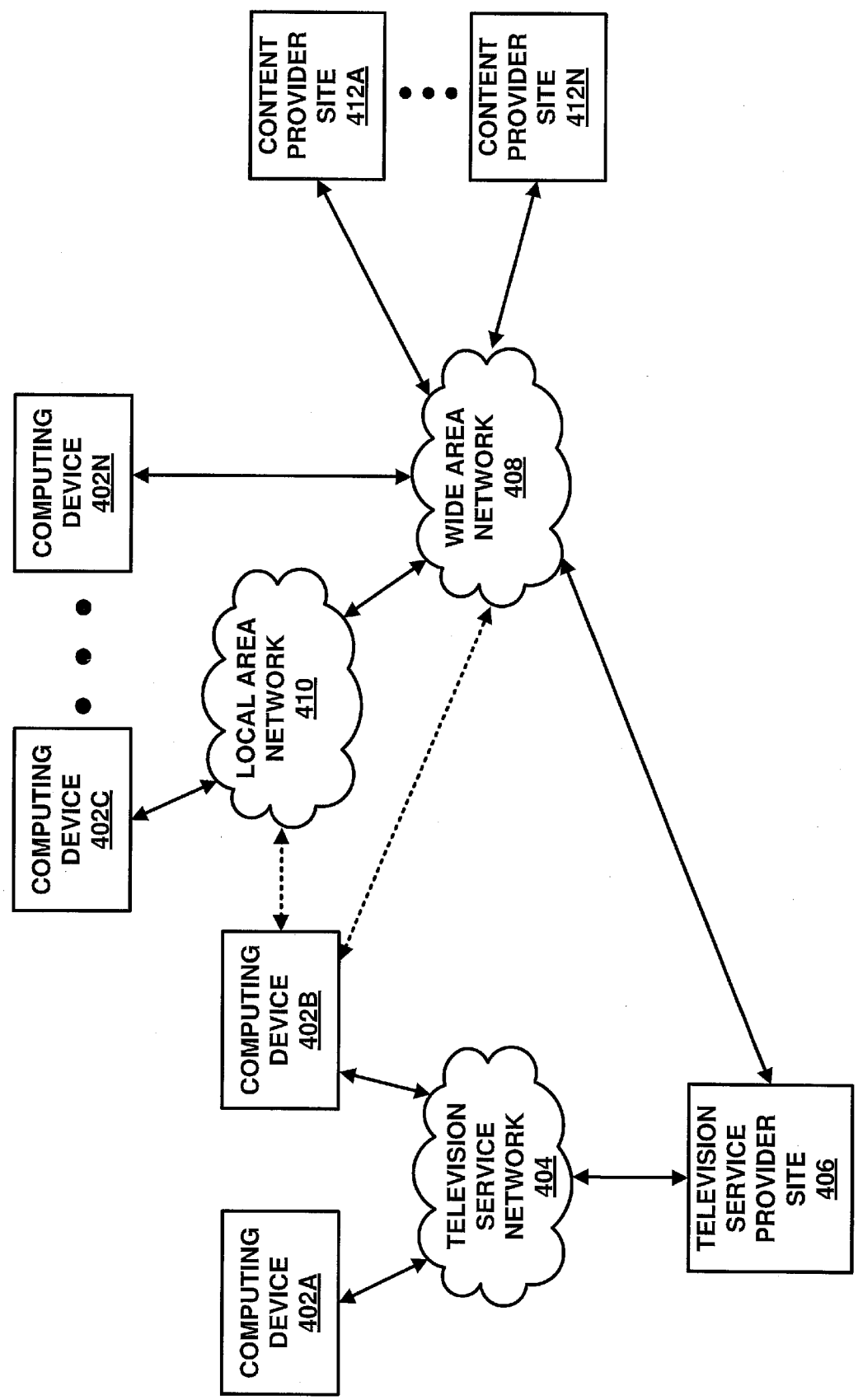
FIG. 4 is a conceptual drawing illustrating an example of components that may be included in an implementation of a system that may be configured to encode and decode video data according to one or more techniques of this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, $3^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 480 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
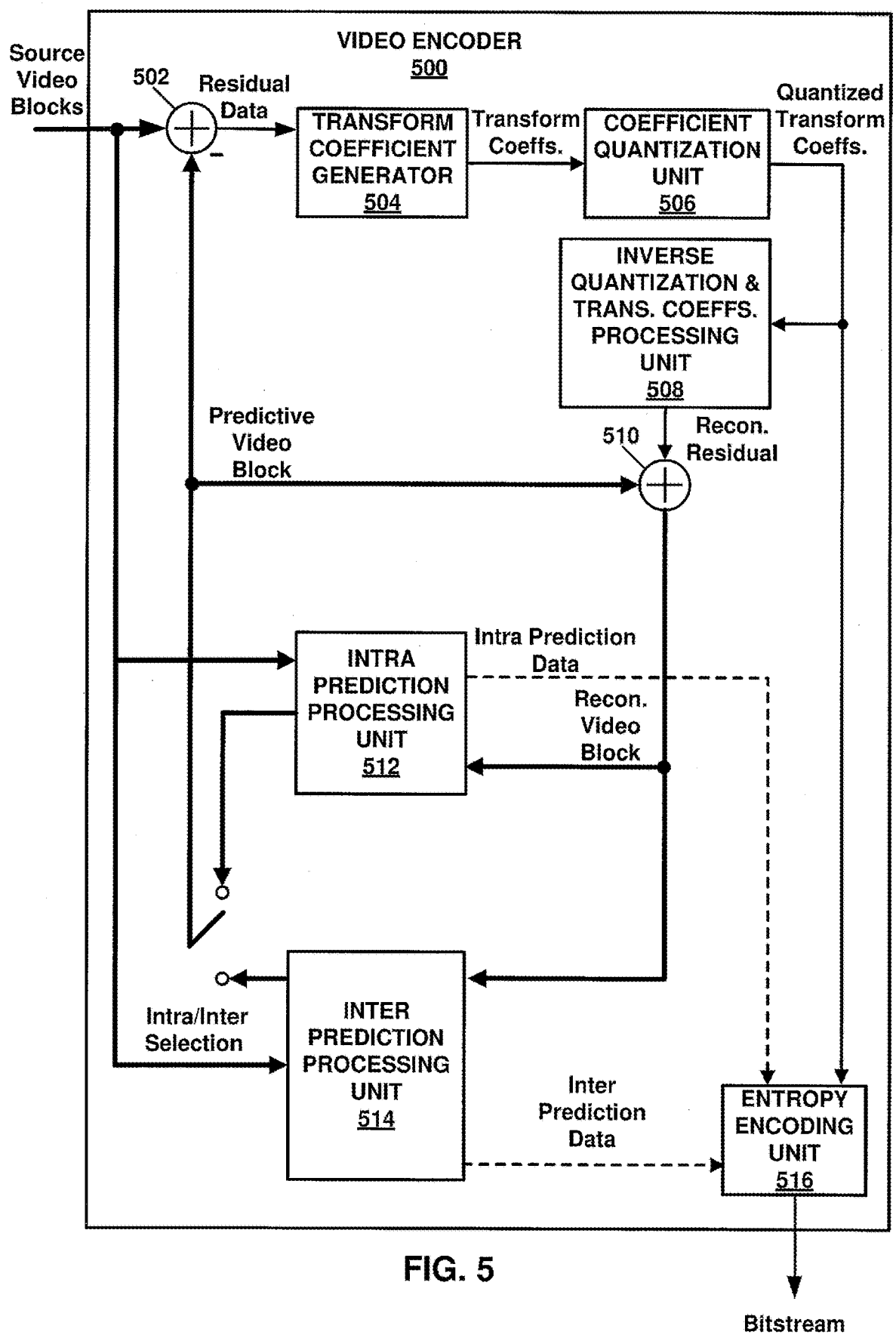
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, and entropy encoding unit 516. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 516 and transform coefficient generator 504. As described above, a transform performed on residual data may be mode dependent (e.g., a secondary transform matrix may be determined based on a predication mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a PU of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 516.

Referring again to FIG. 5, entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclose. In one example, video encoder 500 may generate encoded video data including motion-constrained tile sets.

Referring again to FIG. 1, data encapsulator 107 may receive encoded video data and generate a compliant bitstream, e.g., a sequences of NALs according to a defined data structure. A device receiving a compliant bitstream can reproduce video data therefrom. Further, as described above, sub-bitstream extraction may refer to a process where a device receiving a ITU-T H.265 compliant bitstream forms a new ITU-T H.265 compliant bitstream by discarding and/or modifying data in the received bitstream. In should be noted that the term conforming bitstream may be used in place of the term compliant bitstream. In one example, data encapsulator 107 may be configured to signal information to enable sub-bitstream extraction. In one example, data encapsulator 107 may be configured to generate SEI messages enabling sub-bitstream extraction according to the techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

In one example, data encapsulator 107 may be configured to signal information to enable sub-bitstream extraction by generating a mcts_extraction_info_set( ) SEI according to the syntax illustrated in Table 3.

TABLE 3

| | Descriptor |
|---|---|
| mcts_extraction_info_set( ) { | |
|     num_extraction_info_sets_minus1 | ue(v) |
|     for( i = 0; i <= num_extraction_information_sets_minus1; i++ ) { | |
|         num_associated_tile_set_identifiers_minus1[ i ] | ue(v) |
|         for( j = 0; j <= num_associated_tile_set_identifiers_minus1[ i ]; j++ ) | |
|             mcts_identifier[ i ][ j ] | ue(v) |
|         num_vps_in_extraction_info_set_minus1[ i ] | ue(v) |
|         for( j = 0; j <= num_vps_in_extraction_set_minus1[ i ]; j++ ) | |
|             vps_rbsp_data_length[ i ][ j ] | ue(v) |
|         num_sps_in_extraction_info_set_minus1[ i ] | ue(v) |
|         for( j = 0; j <= num_sps_in_extraction_set_minus1[ i ]; j++ ) | |
|             sps_rbsp_data_length[ i ][ j ] | ue(v) |
|         num_pps_in_extraction_info_set_minus1[ i ] | ue(v) |
|         for( j = 0; j <= num_pps_in_extraction_set_minus1[ i ]; j++ ){ | |
|             pps_nuh_temporal_id_plus1[ i ][ j ] | u(3) |
|             pps_rbsp_data_length[ i ][ j ] | ue(v) |
|     } | |
|     while( !byte_aligned( ) ) | |
|         mcts_alignment_bit_equal_to_zero | f(1) |
|     for( j = 0; j <= num_vps_in_extraction_set_minus1[ i ]; j++ ) | |
|         for( k = 0; k <= vps_rbsp_data_length[ i ][ j ]; k++ ) | |
|             vps_rbsp_data_bytes[ i ][ j ][ k ] | u(8) |
|     for( j = 0; j <= num_sps_in_extraction_set_minus1[ i ]; j++ ) | |
|         for( k = 0; k <= sps_rbsp_data_length[ i ][ j ]; k++ ) | |
|             sps_rbsp_data_bytes[ i ][ j ][ k ] | u(8) |
|     for( j = 0; j <= num_pps_in_extraction_set_minus1[ i ]; j++ ) | |
|         for( k = 0; k <= pps_rbsp_data_length[ i ][ j ]; k++ ) | |
|             pps_rbsp_data_bytes[ i ][ j ][ k ] | u(8) |
|     } | |
| } | |

In Table 3, each of syntax elements num_associated_tile_set_identifiers_minus1[i], mcts_identifier[i][j], num_vps_in_extraction_info_set_minus1[i], vps_rbsp_data_length[i][j], num_sps_in_extraction_info_set_minus1[i], sps_rbsp_data_length[i][j], num_pps_in_extraction_info_set_minus1

[i], pps_rbsp_data_length[i][j], mcts_alignment_bit_equal_to_zero, vps_rbsp_data_bytes[i][j][k], sps_rbsp_data_bytes[i][j][k], and pps_rbsp_data_bytes[i][j][k] may have definitions based on the definitions provided above with respect to Table 2. Syntax elements num_extraction_info_sets_minus1 and pps nuh_temporal_id_plus1[i][j] may be based on the following definitions:

num_extraction_info_sets_minus1 plus 1 indicates the number of extraction information sets contained in the MCTS extraction information set SEI message to be applied in the mcts extraction process. The value of num_extraction_info_sets_minus1 shall be in the range of 0 to $2^{32}-2$, inclusive.

The i-th extraction information set shall have a MCTS extraction information set identifier value equal to i.

In another example this condition may be described as follows:

The i-th extraction information set shall have a MCTS extraction information set identifier value MCTSExtractionSetId[i] as follows.

```
for( i = 0; i <= num_extraction_information_sets_minus1; i++ ) {
  MCTSExtractionSetId[i] = i;
}
``` pps_nuh_temporal_id_plus1[i][j] specifies a temporal identifier for generating PPS NAL unit associated with PPS data specified in PPS RBSP specified by pps_rbsp_data_bytes[i][j][ ] for the j-th replacement picture parameter set for the i-th extraction information set.

In this manner, a device (e.g., destination device 120) receiving a SEI message including a mcts_extraction_info_set( ) having the syntax illustrated in Table 3 may be configured to perform a MCTS sub-bitstream extraction according to the following process:

Let a bitstream inBitstream, a target MCTS identifier mctsIdTarget, target MCTS extraction information set identifier mctsEISIdTarget, and a target highest Temporand value mctsTIdTarget be the inputs to the sub-bistream MCTS extraction process.

The output of the sub-bistream MCTS extraction process is a sub-bitstream outBitstream.

It is a requirement of bitstream conformance for the input bitstream that any output sub-bitstream that is the output of the process specified in this clause with the bitstream shall be a conforming bitstream.

The output sub-bitstream is derived as follows:
The bitstream outBitstream is set to be identical to the bitstream inBitstream.
The lists ausWithVPS, ausWithSPS and ausWithPPS are set to consist of all access units within outBitstream containing VCL NAL units with types VPS_NUT, SPS_NUT and PPS_NUT.
Remove all SEI NAL units that have nuh_layer_id equal to 0 and that contain non-nested SEI messages.
NOTE 2—A "smart" bitstream extractor may include appropriate non-nested SEI messages in the extracted sub-bitstream, provided that the SEI messages applicable to the sub-bitstream were present as nested SEI messages in the mcts_extraction_info_nesting( ) in the original bitstream.
Remove from outBitstream all NAL units with types:
VCL NAL units that contain tiles not belonging to the tile set with mcts_id[i] equal to mctsIdTarget,
non-VCL NAL units with types VPS_NUT, SPS_NUT or PPS_NUT.
Insert into all access units within the list ausWithVPS in outBitstream num_vps_in_extraction_info_minus1[mctsEISIdTarget] plus 1 NAL units with type VPS_NUT generated from the VPS RBSP data in the mctsEISIdTarget-th MCTS extraction information set, i.e. vps_rbsp_data_bytes[mctsEISIdTarget][j][ ] for all values of j in the range of 0 to num_vps_in_extraction_info_minus1[mctsEISIdTarget], inclusive. For each VPS_NUT that is generated the nuh_layer_id shall be set equal to 0 and nuh_temporal_id_plus1 shall be set equal to 1.
Insert into all access units within the list ausWithSPS in outBitstream num_sps_in_extraction_info_minus1[mctsEISIdTarget] plus 1 NAL units with type SPS_NUT generated from the SPS RBSP data in the mctsEISIdTarget-th MCTS extraction information set, i.e. sps_rbsp_data_bytes[mctsEISIdTarget][j][ ] for all values of j in the range of 0 to num_sps_in_extraction_info_minus1[mctsEISIdTarget], inclusive. For each SPS_NUT that is generated the nuh_layer_id shall be set equal to 0 and nuh_temporal_id_plus1 shall be set equal to 1
Insert into all access units within the list ausWithPPS in outBitstream NAL units with type PPS_NUT generated from the PPS RBSP data in the mctsEISIdTarget-th MCTS extraction information set, i.e. pps_rbsp_data_bytes[mctsEISIdTarget][j][ ] for all values of j in the range of 0 to num_pps_in_extraction_info_minus1[mctsEISIdTarget], inclusive for which pps_nuh_temporal_id_plus1[mctsEISIdTarget][j] is less than or equal to mctsTIdTarget. For each PPS_NUT that is generated the nuh_layer_id shall be set equal to 0 and nuh_temporal_id_plus1 shall be set equal to pps_nuh_temporal_id_plus1[mctsEISIdTarget][j] for all values of j in the range of 0 to num_pps_in_extraction_info_minus1[mctsEISIdTarget], inclusive for which pps_nuh_temporal_id_plus1[mctsEISIdTarget][j] is less than or equal to mctsTIdTarget.
Remove from outBitstream all NAL units with Temporand greater than mctsTIdTarget.
For each remaining VCL NAL units in outBitstream, adjust the slice segment header as follows:
For the first VCL NAL unit within each access unit, set the value of first_slice_segment_in_pic_flag equal to 1, otherwise 0.
Set the value of slice segment address according to the tile setup defined in the PPS with pps_pic_parameter_set_id equal to slice_pic_parameter_set_id.

In this manner, according to the techniques described herein signalling of Picture Parameters Set (PPS) Temporal ID information for replacement Picture Parameter Sets is enabled, creation of NAL unit headers for parameters sets is specified, and a sub-bitstream MCTS extraction process allows extraction of bitstream for a target highest TemporalID value in addition to a target MCTS identifier, and target MCTS extraction information set identifier. Further, a rule is provided specifying assignment of MCTS extraction information set identifier values.

In one example, the a MCTS sub-bitstream extraction process may receive a target layer identifier list mctsLayerIdListTarget as an input and may remove from outBitstream all NAL units with nuh_layer_id not among the values included in mctsLayerIdListTarget.

In one example, the a MCTS sub-bitstream extraction process may receive a target highest Temporand value mctsTIdTarget and a target layer identifier list mctsLayerIdListTarget as an input and may remove from outBitstream all NAL units with Temporand greater than mcts-TIdTarget or nuh_layer_id not among the values included in mctsLayerIdListTarget.

In one example, instead of signalling pps_nuh_temporal_id_plus1[mctsEISIdTarget][j] following rule may be applied for the creation of PPS_NUTs:

For each PPS_NUT that is generated the nuh_layer_id shall be set equal to 0 and nuh_temporal_id_plus1 shall be set equal to 1.

In one example, instead of signalling pps_nuh_temporal_id_plus1[mctsEISIdTarget][j] following rule may be applied for the creation of PPS_NUTs:

Insert into all access units within the list ausWithPPS in outBitstream num_pps_in_extraction_info_minus1[mctsEISIdTarget] plus 1 NAL units with type PPS_NUT generated from the PPS RBSP data in the mctsEISIdTarget-th MCTS extraction information set, i.e. pps_rbsp_data_bytes [mctsEISIdTarget][j][ ] for all values of j in the range of 0 to num_pps_in_extraction_info_minus1[mctsEISIdTarget], inclusive. For each PPS_NUT that is generated the nuh_layer_id shall be set equal to 0 and nuh_temporal_id_plus1 shall be set equal to value of nuh_temporal_id_plus1 of the PPS_NUT in the current access unit within outbitstream.

In one example, the following constraint may be imposed:

The signaled pps_nuh_temporal_id_plus1[mctsEISIdTarget][j] shall be less than or equal to the value of nuh_temporal_id_plus1 of the PPS_NUT that the replacement PPS replaces.

In one example following rules may be applied for the creation of VPS NUTs, SPS NUTs and PPS NUTs:

For each VPS_NUT that is generated the nuh_layer_id shall be set equal to the nuh_layer_id value of the MCTS extraction information set SEI message (mcts_extraction_info_set( )) which contains the replacement VPS RBSP data.

For each SPS_NUT that is generated the nuh_layer_id shall be set equal to the nuh_layer_id value of the MCTS extraction information set SEI message (mcts_extraction_info_set( )) which contains the replacement SPS RBSP data.

For each PPS_NUT that is generated the nuh_layer_id shall be set equal to the nuh_layer_id value of the MCTS extraction information set SEI message (mcts_extraction_info_set( )) which contains the replacement PPS RBSP data.

In one example, the presence of pps_nuh_temporal_id_plus1[mctsEISIdTarget][j] may be controlled via a flag and when not present the value of nuh_temporal_id_plus1 for created PPS NUTs shall be inferred to be equal to 1. Table 4 illustrates example syntax of a mcts_extraction_info_set( ) where the presence of pps_nuh_temporal_id_plus1[mctsEISIdTarget][j] may be controlled via a flag.

TABLE 4

| | Descriptor |
|---|---|
| mcts_extraction_info_set( ) { | |
|   num_extraction_info_sets_minus1 | ue(v) |
|   pps_nuh_temporal_id_plus1_present_flag | u(1) |
|   for( i = 0; i <= num_extraction_information_sets_minus1; i++ ) { | |
|     num_associated_tile_set_identifiers_minus1[ i ] | ue(v) |
|     for( j = 0; j <= num_associated_tile_set_identifiers_minus1[ i ]; j++ ) | |
|       mcts_identifier[ i ][ j ] | ue(v) |
|     num_vps_in_extraction_info_set_minus1[ i ] | ue(v) |
|     for( j = 0; j <= num_vps_in_extraction_set_minus1[ i ]; j++ ) | |
|       vps_rbsp_data_length[ i ][ j ] | ue(v) |
|     num_sps_in_extraction_info_set_minus1[ i ] | ue(v) |
|     for( j = 0; j <= num_sps_in_extraction_set_minus1[ i ]; j++ ) | |
|       sps_rbsp_data_length[ i ][ j ] | ue(v) |
|     num_pps_in_extraction_info_set_minus1[ i ] | ue(v) |
|     for( j = 0; j <= num_pps_in_extraction_set_minus1[ i ]; j++ ){ | |
|       if(pps_nuh_temporal_id_plus1_present_flag) | |
|         pps_nuh_temporal_id_plus1[ i ][ j ] | u(3) |
|       pps_rbsp_data_length[ i ][ j ] | ue(v) |
|   } | |
|   while( !byte_aligned( ) ) | |
|     mcts_alignment_bit_equal_to_zero | f(1) |
|   for( j = 0; j <= num_vps_in_extraction_set_minus1[ i ]; j++ ) | |
|     for( k = 0; k <= vps_rbsp_data_length[ i ][ j ]; k++ ) | |
|       vps_rbsp_data_bytes[ i ][ j ][ k ] | u(8) |
|   for( j = 0; j <= num_sps_in_extraction_set_minus1[ i ]; j++ ) | |
|     for( k = 0; k <= sps_rbsp_data_length[ i ][ j ]; k++ ) | |
|       sps_rbsp_data_bytes[ i ][ j ][ k ] | u(8) |
|   for( j = 0; j <= num_pps_in_extraction_set_minus1[ i ]; j++ ) | |
|     for( k = 0; k <= pps_rbsp_data_length[ i ][ j ]; k++ ) | |
|       pps_rbsp_data_bytes[ i ][ j ][ k ] | u(8) |
|   } | |
| } | |

In Table 4, each of syntax elements num_extraction_info_sets_minus1, num_associated_tile_set_identifiers_minus1[i], mcts_identifier[i][j], num_vps_in_extraction_info_set_minus1[i], vps_rbsp_data_length[i][j], num_sps_in_extraction_info_set_minus1[i], sps_rbsp_data_length[i][j], num_pps_in_extraction_info_set_minus1[i], pps_rbsp_data_length[i][j], mcts_alignment_bit_equal_to_zero, vps_rbsp_data_bytes[i][j][k], sps_rbsp_data_bytes[i][j][k], and pps_rbsp_data_bytes[i][j][k] may have definitions based on the definitions provided above with respect to Tables 2 and 3. Syntax elements num_extraction_info_sets_minus1 and pps_nuh_temporal_id_plus1[i][j] may be based on the following definitions:

pps_nuh_temporal_id_plus1 present flag equal to 1 specifies that the syntax element pps_nuh_temporal_id_plus1[i][j] is present.

pps_nuh_temporal_id_plus1 present flag equal to 0 specifies that the syntax element pps_nuh_temporal_id_plus1[i][j] is not present.

pps_nuh_temporal_id_plus1[i][j] specifies a temporal identifier for generating PPS NAL unit associated with PPS data specified in PPS RBSP specified by pps_rbsp_data_bytes[i][j][ ] for the j-th replacement picture parameter set for the i-th extraction information set. When not present pps_nuh_temporal_id_plus1[i][j] is inferred to be equal to 1.

Then the MCTS sub-bistream extraction described above may be followed using the signalled or inferred value of pps_nuh_temporal_id_plus1[i][j].

In one example, instead of signaling various parameter set RBSP (i.e. VPS RBSP, SPS RBSP, PPS RBSP), the parameter set NAL Unit Type data i.e., VPS_NUT, SPS_NUT and PPS_NUT may be signaled directly in the MCTS Extraction information set SEI message. In this case, each of vps_rbsp_data_length[i][j], sps_rbsp_data_length[i][j], pps_rbsp_data_length[i][j], vps_rbsp_data_bytes[i][j][k], sps_rbsp_data_bytes[i][j][k], and pps_rbsp_data_bytes[i][j][k] may be replaced with the following respective syntax elements:

vps_nut_data_length[i][j] indicates the number of bytes vps_nut_data_bytes[i][j][k] of the following j-th replacement VPS_NUT in the i-th extraction information set.

sps_nut_data_length[i][j] indicates the number of bytes sps_nut_data_bytes[i][j][k] of the following j-th replacement SPS_NUT in the i-th extraction information set.

pps_nut_data_length[i][j] indicates the number of bytes pps_nut_data_bytes[i][j][k] of the following j-th replacement PPS_NUT in the i-th extraction information set.

vps_nut_data_bytes[i][j][k] contains the k-th byte of the following j-th replacement VPS_NUT in the i-th extraction information set.

sps_nut_data_bytes[i][j][k] contains the k-th byte of the following j-th replacement SPS_NUT in the i-th extraction information set.

pps_nut_data_bytes[i][j][k] contains the k-th byte of the following j-th replacement PPS_NUT in the i-th extraction information set.

In this example, an extraction process may insert data as follows:

Insert into all access units within the list ausWithVPS in outBitstream num_vps_in_extraction_info_minus1[mctsEISIdTarget] plus 1 NAL units with type VPS_NUT generated from the VPS_NUT data in the mctsEISIdTarget-th MCTS extraction information set, i.e. vps_nut_data_bytes[mctsEISIdTarget][j][ ] for all values of j in the range of 0 to num_vps_in_extraction_info_minus1[mctsEISIdTarget], inclusive.

Insert into all access units within the list ausWithSPS in outBitstream num_sps_in_extraction_info_minus1[mctsEISIdTarget] plus 1 NAL units with type SPS_NUT generated from the SPS_NUT data in the mctsEISIdTarget-th MCTS extraction information set, i.e. sps_nut_data_bytes[mctsEISIdTarget][j][ ] for all values of j in the range of 0 to num_sps_in_extraction_info_minus1[mctsEISIdTarget], inclusive.

Insert into all access units within the list ausWithPPS in outBitstream NAL units with type PPS_NUT generated from the PPS_NUT data in the mctsEISIdTarget-th MCTS extraction information set, i.e. pps_nut_data_bytes[mctsEISIdTarget][j][ ] for all values of j in the range of 0 to num_pps_in_extraction_info_minus1[mctsEISIdTarget], inclusive for which nuh_temporal_id_plus1 value for PPS_NUT_data_bytes[mctsEISIdTarget][j][ ] is less than or equal to mctsTIdTarget.

In one example, in addition to PPS temporal Id information, i.e. pps_nuh_temporal_id_plus1[i][j], layer Id information may be signalled for each VPS, SPS, PPS. That is, the following syntax elements may be signaled:

vps_nuh_layer_id[i][j] specifies a identifier of the layer for generating VPS NAL unit type associated with VPS data specified in VPS RBSP specified by vps_rbsp_data_bytes[i][j][ ] for the j-th replacement video parameter set for the i-th extraction information set.

When not present vps_nuh_layer_id[i][j] is inferred to be equal to 0.

sps_nuh_layer_id[i][j] specifies a identifier of the layer for generating SPS NAL unit type associated with SPS data specified in SPS RBSP specified by sps_rbsp_data_bytes[i][j][ ] for the j-th replacement sequence parameter set for the i-th extraction information set.

When not present sps_nuh_layer_id[i][j] is inferred to be equal to 0.

pps_nuh_layer_id[i][j] specifies a identifier of the layer for generating PPS NAL unit associated with PPS data specified in PPS RBSP specified by pps_rbsp_data_bytes[i][j][ ] for the j-th replacement picture parameter set for the i-th extraction information set.

When not present pps_nuh_layer_id[i][j] is inferred to be equal to 0.

In this example, an extraction process may remove and insert data as follows:

Remove from outBitstream all NAL units with Temporand greater than mctsTIdTarget or nuh_layer_id not among the values included in mctsLayerIdListTarget.

Insert into all access units within the list ausWithVPS in outBitstream num_vps_in_extraction_info_minus1[mctsEISIdTarget] plus 1 NAL units with type VPS_NUT generated from the VPS RBSP data in the mctsEISIdTarget-th MCTS extraction information set, i.e. vps_rbsp_data_bytes[mctsEISIdTarget][j][ ] for all values of j in the range of 0 to num_vps_in_extraction_info_minus1[mctsEISIdTarget], inclusive.

For each VPS_NUT that is generated the nuh_layer_id shall be set equal to vps_nuh_layer_id[mctsEISIdTarget][j] for all values of j in the range of 0 to num_vps_in_extraction_info_minus1[mctsEISIdTarget], inclusive and nuh_temporal_id_plus1 shall be set equal to 1.

Insert into all access units within the list ausWithSPS in outBitstream num_sps_in_extraction_info_minus1[mctsEISIdTarget] plus 1 NAL units with type SPS_NUT generated from the SPS RBSP data in the mctsEISIdTarget-th MCTS extraction information set, i.e. sps_rbsp_data_bytes[mctsEISIdTarget][j][ ] for all values of j in the range of 0 to num_sps_in_extraction_info_minus1[mctsEISIdTarget], inclusive. For each SPS_NUT that is generated the nuh_layer_id shall be set equal to sps_nuh_layer_id[mctsEISIdTarget][j] for all values of j in the range of 0 to num_sps_in_extraction_info_minus1[mctsEISIdTarget], inclusive and nuh_temporal_id_plus1 shall be set equal to 1.

Insert into all access units within the list ausWithPPS in outBitstream NAL units with type PPS_NUT generated from the PPS RBSP data in the mctsEISIdTarget-th MCTS extraction information set, i.e. pps_rbsp_data_bytes[mctsEISIdTarget][j][ ] for all values of j in the range of 0 to num_pps_in_extraction_info_minus1[mctsEISIdTarget], inclusive for which pps_nuh_temporal_id_plus1[mctsEISIdTarget][j] is less than or equal to mctsTIdTarget. For each PPS_NUT that is generated the nuh_layer_id shall be set equal to pps_nuh_layer_id[mctsEISIdTarget][j] and nuh_temporal_id_plus1 shall be set equal to pps_nuh_temporal_id_plus1[mctsEISIdTarget][j] for all values of j in the range of 0 to num_pps_in_extraction_info_minus1[mctsEISIdTarget], inclusive for which pps_nuh_temporal_id_plus1[mctsEISIdTarget][j] is less than or equal to mctsTIdTarget.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I$^2$C, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I$^2$C, or any other logical and physical structure that may be used to interconnect peer devices. Data decapsulator 123 may be configured to receive a bitstream generated by data encaspulator 107 and perform sub-bitstream extraction according to one or more of the techniques described herein. For example, data decapsulator 123 may be configured to remove from bitstream all NAL units with a Temporand greater than a target highest Temporand value mctsTIdTarget.

Video decoder 124 may include any device configured to receive a bitstream (e.g., a MCTS sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
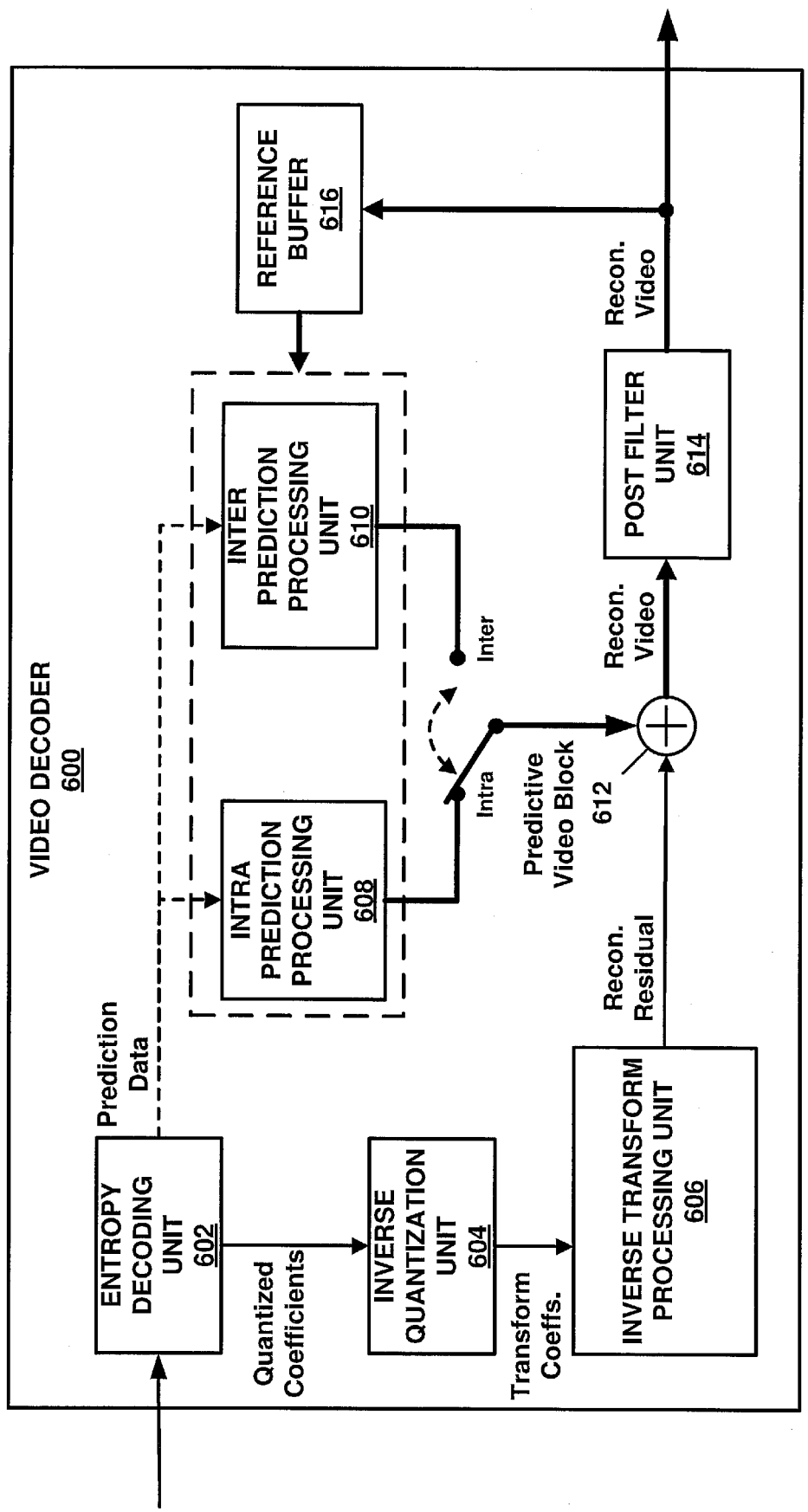
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure. In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. In the example illustrated in FIG. 6, video decoder 600 includes an entropy decoding unit 602, inverse quantization unit and transform coefficient processing unit 604, intra prediction processing unit 606, inter prediction processing unit 608, summer 610, post filter unit 612, and reference buffer 614. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and predication data from a bitstream. In the example, illustrated in FIG. 6, inverse quantization unit and transform coefficient processing unit 604 receives a quantization parameter, quantized coefficient values, transform data, and predication data from entropy decoding unit 602 and outputs reconstructed residual data.

Referring again to FIG. 6, reconstructed residual data may be provided to summer 610 Summer 610 may add reconstructed residual data to a predictive video block and generate reconstructed video data. A predictive video block may be determined according to a predictive video technique (i.e., intra prediction and inter frame prediction). Intra prediction processing unit 606 may be configured to receive intra prediction syntax elements and retrieve a predictive video block from reference buffer 614. Reference buffer 614 may include a memory device configured to store one or more frames of video data. Intra prediction syntax elements may identify an intra prediction mode, such as the intra prediction modes described above. Inter prediction processing unit 608 may receive inter prediction syntax elements and generate motion vectors to identify a prediction block in one or more reference frames stored in reference buffer 814. Inter prediction processing unit 608 may produce motion compensated blocks, possibly performing interpolation based on interpolation filters. Identifiers for interpolation filters to be used for motion estimation with sub-pixel precision may be included in the syntax elements. Inter prediction processing unit 808 may use interpolation filters to calculate interpolated values for sub-integer pixels of a reference block. Post filter unit 612 may be configured to perform filtering on reconstructed video data. For example, post filter unit 612 may be configured to perform deblocking and/or Sample Adaptive Offset (SAO) filtering, e.g., based on parameters specified in a bitstream. Further, it should be noted that in some examples, post filter unit 612 may be configured to perform proprietary discretionary filtering (e.g., visual enhancements, such as, mosquito noise reduction). As illustrated in FIG. 6, a reconstructed video block may be output by video decoder 600. In this manner, video decoder 600 may be configured to generate reconstructed video data according to one or more of the techniques described herein.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

<Overview>

In one example, a method of signaling of a motion-constrained tile set comprises generating a message including a replacement picture parameter set and a value specifying a temporal identifier associated with the replacement picture parameter set, and transmitting the generated message over a communications medium.

In one example, a device comprises one or more processors configured to generate a message including a replacement picture parameter set and a value specifying a temporal identifier associated with the replacement picture parameter set, and transmit the generated message over a communications medium.

In one example, a non-transitory computer-readable storage medium comprises instructions stored thereon that, when executed, cause one or more processors of a device to generate a message including a replacement picture parameter set and a value specifying a temporal identifier associated with the replacement picture parameter set, and transmit the generated message over a communications medium.

In one example, an apparatus comprises means for generating a message including a replacement picture parameter set and a value specifying a temporal identifier associated with the replacement picture parameter set, and means for transmitting the generated message over a communications medium.

In one example, a method of performing sub-bitstream extraction of a motion-constrained tile set comprises receiving a message including a replacement picture parameter set and a value specifying a temporal identifier associated with the replacement picture parameter set, and performing sub-bitstream extraction based on the temporal identifier associated with the replacement picture parameter set.

In one example, a device comprises one or more processors configured to receive a message including a replacement picture parameter set and a value specifying a temporal identifier associated with the replacement picture parameter set, and perform sub-bitstream extraction based on the temporal identifier associated with the replacement picture parameter set.

In one example, a non-transitory computer-readable storage medium comprises instructions stored thereon that, when executed, cause one or more processors of a device to receive a message including a replacement picture parameter set and a value specifying a temporal identifier associated with the replacement picture parameter set, and perform sub-bitstream extraction based on the temporal identifier associated with the replacement picture parameter set.

In one example, an apparatus comprises means for receiving a message including a replacement picture parameter set and a value specifying a temporal identifier associated with the replacement picture parameter set, and means for performing sub-bitstream extraction based on the temporal identifier associated with the replacement picture parameter set.

The details of one or more examples are set forth in the accompanying drawings and the description below. Other features, objects, and advantages will be apparent from the description and drawings, and from the claims.

The invention claimed is:

1. A method of signaling of a motion-constrained tile set, the method comprising:
  generating a motion-constrained tile set extraction information message including syntax elements that provide information corresponding to motion-constrained tile set sub-bitstream extraction including:
    a syntax element specifying the number of replacement picture parameter sets in an extraction information set, and
    for each of the syntax elements specifying the number of replacement picture parameter sets in an extraction information set, an instance of a syntax element specifying a temporal identifier of the replacement picture parameter set; and
  transmitting the generated message over a communications medium.

2. A method of performing sub-bitstream extraction of a motion-constrained tile set, the method comprising:
  receiving a motion-constrained tile set extraction information message including syntax elements that provide information corresponding to motion-constrained tile set sub-bitstream extraction;
  parsing a syntax element specifying the number of replacement picture parameter sets in an extraction information set;
  for each of the syntax elements specifying the number of replacement picture parameter sets in an extraction information set, parsing a respective syntax element specifying a temporal identifier associated with the replacement picture parameter set; and
  performing sub-bitstream extraction associated with the syntax element specifying the temporal identifier associated with the replacement picture parameter set.

3. A non-transitory computer-readable storage medium comprising instructions stored thereon that, when executed, cause one or more processors of a device to perform any and all combinations of the steps of claim 1.

* * * * *